United States Patent [19]
Smit

[11] Patent Number: 5,865,097
[45] Date of Patent: Feb. 2, 1999

[54] APPARATUS FOR HEATING WATER, INTENDED FOR THE PREPARATION OF HOT BEVERAGES

[75] Inventor: Gerard Clement Smit, Amerongen, Netherlands

[73] Assignee: Smitdesign B.V., Amerongen, Netherlands

[21] Appl. No.: 856,067

[22] Filed: May 14, 1997

[51] Int. Cl.[6] .............................. A47J 31/54; A47J 31/00; A47J 27/21

[52] U.S. Cl. .......................... 99/323.3; 99/275; 392/451; 392/461; 392/480; 222/146.5

[58] Field of Search .................. 99/300, 323.3, 99/304, 275, 305, 306, 307; 222/146.2, 146.5; 126/344, 345; 392/441, 450, 451, 458, 461, 479, 480

[56] References Cited

U.S. PATENT DOCUMENTS

| | | |
|---|---|---|
| 2,369,526 | 2/1945 | Brandl . |
| 3,100,434 | 8/1963 | Bunn ..................................... 99/305 X |
| 3,459,118 | 8/1969 | Hausam ................................. 99/305 X |
| 4,473,003 | 9/1984 | Stone, Jr. . |
| 5,584,229 | 12/1996 | Anson ................................... 99/307 X |

FOREIGN PATENT DOCUMENTS

| | | |
|---|---|---|
| 0 228 098 | 7/1987 | European Pat. Off. . |
| 87 08 082 U | 7/1987 | Germany . |
| 03012112 | 1/1991 | Japan . |
| 248 441 A | 2/1948 | Switzerland . |
| 343 145 | 2/1931 | United Kingdom . |
| 622 025 | 5/1949 | United Kingdom . |

Primary Examiner—Reginald L. Alexander
Attorney, Agent, or Firm—Roberts & Mercanti LLP

[57] ABSTRACT

Apparatus for heating water intended for the preparation of hot beverages, comprising a cold-water reservoir (2) for storing unheated water and a hot-water reservoir (3) for storing heated water, wherein a heat-maintaining element (4) is accommodated in the hot-water reservoir (3), wherein the hot-water reservoir (3) comprises a draw-off tap (5), and wherein a conduit (6) is connected to the cold-water reservoir (2) which conduit opens into the hot-water reservoir (3), wherein a through-flow heating element (7) is accommodated in this conduit (6).

11 Claims, 1 Drawing Sheet

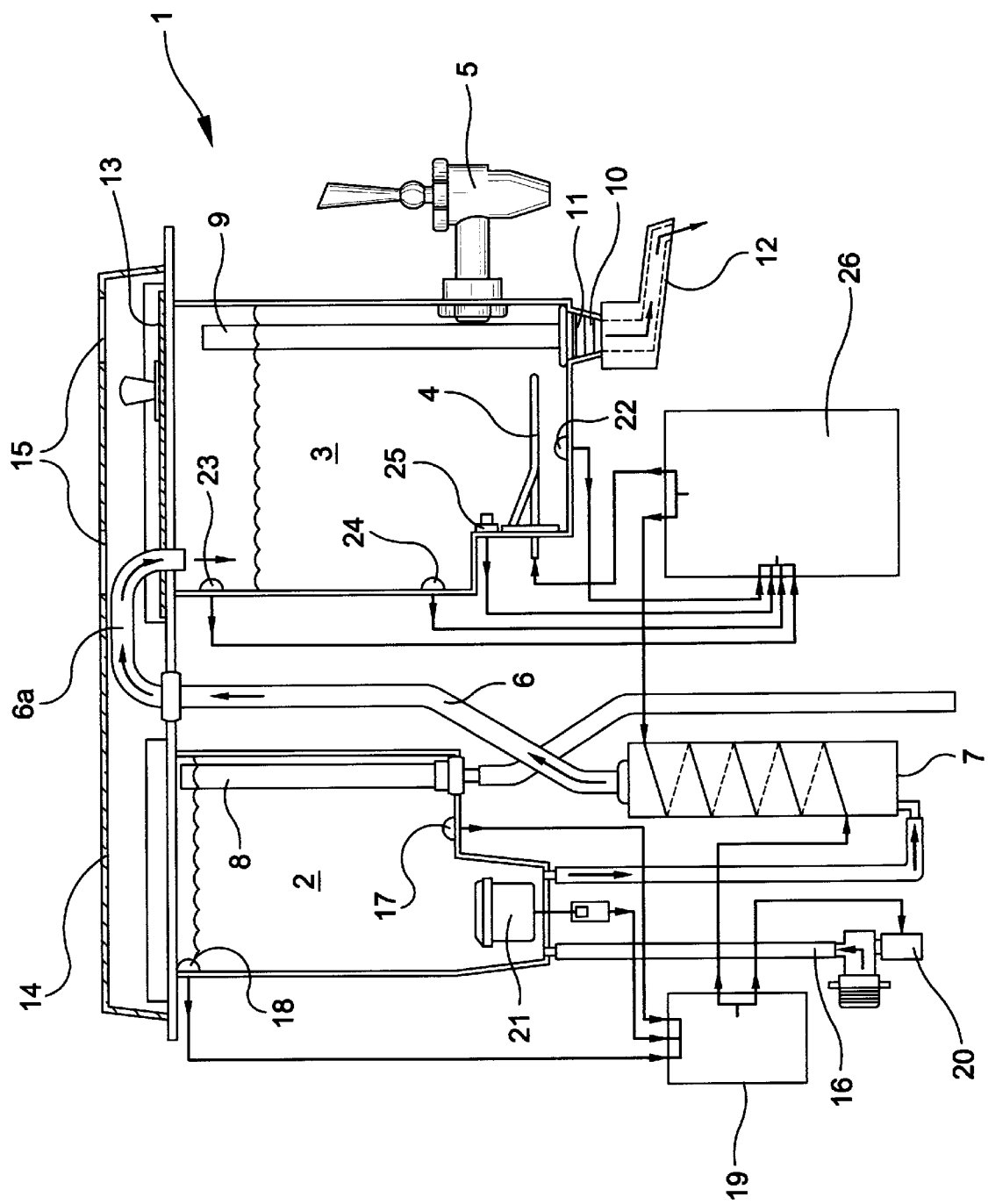

APPARATUS FOR HEATING WATER, INTENDED FOR THE PREPARATION OF HOT BEVERAGES

BACKGROUND OF THE INVENTION

The invention relates to an apparatus for heating water intended for the preparation of hot beverages. Such apparatus are known in the form of a reservoir in which a heating element is accommodated and to which a draw-off tap is connected. The known apparatus is filled with an amount of cold water, which amount is heated up to the desired temperature, whereupon a signal light indicates that the water has reached the desired temperature and warm water can be drawn off. When a given minimum water level is reached in the tank, drawing off can no longer take place and the tank should be replenished, whereupon one must wait until the water in the reservoir has again the desired temperature. Hence, the known apparatus provides a batchwise heating of a particular amount of water. The drawbacks thereof are that during the heating up of the amount of water introduced batchwise into the reservoir, no water of the desired end temperature can be drawn off, and the relatively long waiting period.

To overcome this drawback, there are also known apparatus comprising a reservoir in which a heating element and a draw-off tap are accommodated, the reservoir being connected to a water supply and the water level in the reservoir being kept substantially constant. In such an apparatus, as soon as water is being drawn off, the reservoir is replenished until the desired water level is reached. Drawbacks of this known apparatus are the long initial waiting period and the fact that when much water is drawn off successively, the temperature of the water in the reservoir drops as a consequence of the feed of cold water. Generally, the power of the heating element is insufficient for heating up the fed cold water quickly enough, so that the temperature of the water in the reservoir cannot be kept constant within a temperature range of $\pm 3°-4°$ C.

SUMMARY OF THE INVENTION

The object of the invention is to provide an apparatus for heating water intended for preparing hot beverages without the above-mentioned drawbacks of the known apparatus, i.e. an apparatus having a very short initial waiting period, from which water of a very constant temperature can be drawn off and which can be replenished during the drawing off without this affecting the temperature of the water in the hot-water reservoir.

To this end, the apparatus according to the invention comprises a cold-water reservoir for storing unheated water and a hot-water reservoir for storing heated water, wherein a heat-maintaining element is accommodated in the hot-water reservoir, wherein the hot-water reservoir comprises a draw-off tap, and wherein a conduit is connected to the cold-water reservoir and opens into the hot-water reservoir, wherein a through-flow heating element is accommodated in this conduit.

In such an apparatus, the hot-water reservoir is filled with water heated in the through-flow heating element, so that the replenishing of the hot-water reservoir does not affect the temperature of the water that is already present in the hot-water reservoir. The filling of the cold-water reservoir can take place batchwise without the result being that temporarily no hot water can be drawn off because the batch of water fed has not yet been heated to the desired temperature. The heat-maintaining element located in the hot-water reservoir need only have a small power, as this element is only intended for maintaining the temperature of the water contained in the hot-water reservoir.

With an apparatus of such design according to the invention, about 25 liter hot water can be produced whose temperature is minimally 90° C. and maximally 97° C., the power of the through-flow heating element and the heat-maintaining element together being such that the apparatus can be connected to a single-phase electricity connection. Thus, an hour capacity of about 200 cups of hot water is realized.

Another important advantage accomplished with the apparatus according to the invention is that hot water of the desired temperature can always be obtained, even when the water level in the hot-water reservoir has dropped below the level of the draw-off point. After all, as long as cold water is present in the cold-water reservoir, the hot-water reservoir is filled with hot water of the desired temperature by means of the through-flow heating element. Hence, if the draw-off tap is fully opened for a long time, hot water will, in course of time, flow from the draw-off tap at a flow rate corresponding to the flow rate produced by the through-flow heating element.

According to a further elaboration of the invention, both the cold-water reservoir and the hot-water reservoir comprise an overflow pipe, the overflow pipe in the hot-water reservoir being detachably accommodated in a discharge opening located in substantially the lowest point of the hot-water reservoir.

With such a detachable overflow pipe, the discharge opening can be released by detaching the overflow pipe, enabling the hot-water reservoir to drain completely, because the discharge opening is located in the lowest point of the hot-water reservoir. This is of importance when the hot-water reservoir is decalcified or not used for a longer period. The water that contains decalcifier can then be entirely removed from the apparatus without the apparatus having to be tilted or otherwise manipulated for this purpose.

To prevent water from leaking away via the discharge opening during the normal use, according to a further elaboration of the invention, the overflow pipe of the hot-water reservoir comprises a discharge stopper through which a discharge channel extends, which discharge stopper is fittingly receivable in the discharge opening to which an outflow pipe is connected.

Optionally, the apparatus for heating water intended for the preparation of hot beverages can be combined with a coffee-making apparatus comprising a second cold-water reservoir having a second discharge conduit in which a second through-flow heater is accommodated, the second discharge conduit opening above a coffee filter holder, which coffee filter holder comprises an extract discharge opening into a coffee pot, a control of the apparatus being designed so that in each case, only one through-flow heating element is switched on, while the second through-flow heating element, intended for forming hot water for coffee, is given priority over the through-flow heating element intended for filling the hot-water reservoir. This prevents the withdrawal of too much power from the electricity grid when the coffee-making portion and the hot-water portion are switched on simultaneously. This enables connecting the apparatus to a public single-phase electricity connection. It is observed that a combined coffee-making apparatus and hot-water apparatus connectable to a public three-phase connection, permitting both appliances to be switched on simultaneously, is also a possible embodiment according to the invention.

It is observed that the Japanese Abstract having publication number 03012112, relating to Japanese patent application JP-A-1 148 023, discloses an apparatus comprising a cold-water reservoir for storing unheated water and a hot-water reservoir for storing heated water, wherein a conduit is connected to the cold-water reservoir which opens into the hot-water reservoir, and wherein a heating element is accommodated in this conduit. However, this known apparatus is an apparatus of an altogether different type from the apparatus according to the invention. The apparatus according to the invention is intended for producing hot tapping water, while the apparatus known from the Japanese Abstract is intended for making coffee. The apparatus according to the invention provides an apparatus whereby hot tapping water is available at any moment. Not only does the hot-water reservoir for that purpose comprise a draw-off tap for drawing off water, the hot-water reservoir moreover comprises a heat-maintaining element, so that the water that is heated by means of the through-flow heating element and that is introduced into the hot-water reservoir is also kept warm when no water is drawn off for a while. In the coffee maker described in the Japanese Abstract, the temperature in the hot-water reservoir is prevented from dropping by feeding hot water to the reservoir. Hence, a heat-maintaining element in the hot-water reservoir is lacking.

Further elaborations of the invention are described in the subclaims and will be specified on the basis of an exemplary embodiment, with reference to the accompanying drawing.

BRIEF DESCRIPTION OF THE DRAWINGS

FIG. 1 schematically shows an exemplary embodiment wherein the housings of the reservoirs have been left out for the sake of clarity.

DETAILED DESCRIPTION OF THE PREFERRED EMBODIMENT

The apparatus 1 for the heating of water intended for the preparation of hot beverages comprises a cold-water reservoir 2 for storing unheated water and a hot-water reservoir 3 for storing heated water. Included in the hot-water reservoir 3 is a heat-maintaining element 4. The hot-water reservoir 3 comprises a draw-off tap 5. Connected to the cold-water reservoir 2 is a conduit 6 opening into the hot-water reservoir 3. In the present case, the conduit 6 opens into the hot-water reservoir 3 via a transition 6a. In the conduit 6, a through-flow heating element 7 is incorporated. Such through-flow heating element 7 is known per se for heating water for the purpose of making coffee. It comprises a generally cylindrical housing around which an electrically conductive spiral has been wound which becomes hot when electric tension is applied thereto. As a result, the water in the through-flow heating element is heated and starts to boil, as a result of which air bubbles are formed and the pressure in the cylindrical housing increases. The water contained in the through-flow heating element 7 seeks the way-out of least resistance and chooses therefor the transition pipe part 6 leading from the through-flow heating element 7 to the hot-water reservoir 3.

The transition pipe part 6 opens, via a transition 6a, into the hot-water reservoir 3 at a height located above the maximum water level in the hot-water reservoir 3. In the cold-water reservoir 2, the inlet of the transition pipe 6 is located at the lowest point of the cold-water reservoir 2. Thus, the water pressure on the inlet side of the transition pipe 6 will always be higher than at the outlet side of the transition pipe 6, so that, when the through-flow heating element 7 is switched on, all the water present in the cold-water reservoir 3 will be brought into the hot-water reservoir 3 via the through-flow heating element 7 and the transition pipe 6.

In the present exemplary embodiment, the cold-water reservoir 2 and the hot-water reservoir 3 each comprise an overflow pipe 8 and 9 respectively. The overflow pipe 9 in the hot-water reservoir 3 is detachably accommodated in a discharge opening 10 which is located in substantially the lowest point of the hot-water reservoir 3. For this purpose, the overflow pipe 9 of the hot-water reservoir 3 comprises a discharge stopper 11 through which a discharge channel extends, which discharge stopper 11 is fittingly receivable in the discharge opening 10. Connected to the discharge opening 10 is an outflow pipe 12 for draining the hot-water reservoir 3 completely. This complete draining is important in particular when the hot-water reservoir 3 has been decalcified by means of chemicals. The water that contains decalcifier can be removed from the hot-water reservoir by removing the detachable overflow pipe 9, so that the water flows out of the hot-water reservoir 3 via the outflow pipe 12.

The hot-water reservoir 3 preferably comprises a removable lid 13 of a material of a high thermal conduction coefficient for preventing the formation of condensed water. Such removable lid 13 could preferably be manufactured from stainless steel and, because of the good thermal conduction, adopts a high temperature fairly quickly, so that condense formation on the lid 13 is minimal. In the present exemplary embodiment, there is moreover provided a cover 14 which in a closed position extends over the open top side of the hot-water reservoir 3 and the cold-water reservoir 2. At least at the location of the hot-water reservoir 3, the cover 14 is provided with vent holes 15. Such vent holes 15 create an air circulation under the cover, preventing condensation under the cover. It is understood that two separate covers 14 are possible as well, one cover covering the cold-water reservoir 2 and the other cover covering the hot-water reservoir 3.

The filling of the cold-water reservoir can be performed batchwise manually, but in the present exemplary embodiment, a different solution has been opted for. The cold-water reservoir 2 is connected to a filling conduit 16 which is connectable to the public water supply system. Provided in the cold-water reservoir 2 are a first sensor 17 for the minimum water level and a second sensor 18 for the maximum water level. The sensors 17 and 18 are connected to a control 19. Included in the filling conduit 16 is a controllable closing valve 20 which is connected to the control 19 and is opened and closed depending on the water level observed by the sensors 17, 18. When it is established by the first sensor 17 that the water level in the cold-water reservoir 2 drops below the minimum water level, the closing valve 20 is opened by the control 19, until the second sensor 18 indicates that the water level in the cold-water reservoir 2 has reached its maximum.

In the cold-water reservoir 2, at the lowest point thereof, a float 21 is arranged, connected to a control 19, which control 19 is also connected to the through-flow heating element 7. The float is adapted to provide a signal to the control 19 when the water level in the cold-water reservoir 2 drops below a particular minimum level. The control 19 is adapted to switch off the through-flow heating element 7 upon the reception of this signal. This prevents the occurrence of overheating of the through-flow heating element 7 owing to the fact that the heating element 7 remains under electric tension while water to be heated is no longer present, which is a situation that could otherwise occur in the case of a manually filled embodiment. It is observed that such a safeguard could be realized by the second sensor 17, while the float 21 could be omitted. Hence, the float 21 is necessary particularly when the cold-water reservoir 2 is filled manually. Therefore, the exemplary embodiment shown is suitable for filling the cold-water reservoir 2 manually as well as automatically.

The hot-water reservoir 3 comprises a third sensor 22 for the minimum water level, a fourth sensor 23 for the maximum water level and a fifth sensor 24 whereby a water level is detected above which water level the tapping of warm water is possible. Also provided in the hot-water reservoir 3 is a temperature sensor 25, which temperature sensor 25 is located below the level at which the fifth sensor 24 is provided. The sensors 22, 23, 24, 25 are all connected to a control 26 which switches the heat-maintaining element 4 on and off depending on, inter alia, the temperature signal provided by the temperature sensor 25. The control 26 switches on the through-flow heating element 7 when the water level in the hot-water reservoir 3 is below the level of the fourth sensor 23 and switches on or off a signal light when the water level is respectively above or below the level, or vice versa, of the fifth sensor 24. It is understood that two signal lights are possible as well, one signal light burning and the other one being off when the water level is below the level of the fifth sensor 24 and the other way round when the water level is above the level of the fifth sensor 24. It is also understood that the control 26 which switches on or off the through-flow heating element can be combined with the control 19 regulating the water level in the cold-water reservoir 2.

The control 26 is moreover adapted to switch the heat-maintaining element 4 on and off so that the water in the hot-water reservoir 3 has a temperature of between about 90° C. and about 97° C.

In an embodiment not shown, the apparatus can be combined with a coffee-making apparatus of a construction known per se. Such a coffee maker is generally provided with a cold-water reservoir having a discharge conduit incorporating a through-flow heater, which discharge conduit opens above a coffee filter holder, which coffee filter holder comprises an extract discharge opening into a coffee pot. According to a further elaboration of the invention, the control of such a combination apparatus can be designed so that in each case only one through-flow heater is switched on, with the second through-flow heater, intended for forming hot water for coffee, is given priority over the through-flow heater 7 intended for filling the hot-water reservoir 3. In this manner, during the preparation of hot water, coffee can nevertheless be made and it is not necessary to wait until the hot-water reservoir 3 is entirely filled with warm water. Such a regulation is necessary for enabling the combination apparatus to be connected to a public single-phase electricity connection. The through-flow heating elements have for instance a power of 2200 W and the heat-maintaining element 4 has for instance a power of 450 W. Optionally, the apparatus can further comprise one or two hotplates on which coffee pots can be disposed. The power required for such hotplates is for instance 80 W. For such an embodiment, the maximum power to be withdrawn from the electricity grid is 2810 W, which, in the case of a voltage of 220 V, results in a current of 12.7 A. With an apparatus of such design, about 25 liter hot water per hour can be drawn off.

It is observed that in the exemplary embodiment shown, the draw-off tap 5 is provided at the end face of the apparatus. The operating means, such as for instance an on/off-switch, will also be provided at this side. It is understood that the draw-off tap and the operating means can also be provided on a longitudinal side of the apparatus. When purchasing the apparatus, the prospective user can opt for the type that best suits the space available to him/her and the optimum position of the apparatus within the space.

It is understood that the invention is not limited to the exemplary embodiments described, but that various modifications are possible within the framework of the invention.

I claim:

1. An apparatus for heating water intended for the preparation of hot beverages, comprising a cold-water reservoir (2) for storing unheated water and a hot-water reservoir (3) for storing heated water, wherein a heat-maintaining element (4) is accommodated in the hot-water reservoir (3), wherein the hot-water reservoir (3) comprises a draw-off tap (5), and wherein a conduit (6) is connected to the cold-water reservoir (2) which conduit opens into the hot-water reservoir (3), wherein a through-flow heating element (7) is accommodated in said conduit (6).

2. An apparatus according to claim 1, characterized in that the cold-water reservoir (2) and the hot-water reservoir (3) each comprise an overflow pipe (8, 9), wherein the overflow pipe (9) in the hot-water reservoir (3) is detachably accommodated in a discharge opening (10) located in substantially the lowest point of the hot-water reservoir (3).

3. An apparatus according to claim 2, characterized in that the overflow pipe (9) of the hot-water reservoir (3) comprises a discharge stopper (11) through which a discharge channel extends, which discharge stopper (11) is fittingly receivable in the discharge opening (10) to which an outflow pipe (12) is connected.

4. An apparatus according to claim 1, characterized in that the hot-water reservoir (3) comprises a removable lid (13) of a material of a high thermal conduction coefficient for retaining condensed water.

5. An apparatus according to claim 1, characterized by a cover (14) which in a closed position extends over the open top side of the hot-water reservoir and/or the cold-water reservoir, wherein the cover (14), at least at the location of the hot-water reservoir (3), is provided with vent holes (15).

6. An apparatus according to claim 1, characterized in that the cold-water reservoir (2) is connected to a filling conduit (16) which is connectable to the public water supply system, wherein a first sensor (17) for the minimum water level and a second sensor (18) for the maximum water level are provided in the cold-water reservoir (2), said sensors (17, 18) being connected to a control (19), wherein the filling conduit (16) comprises a controllable closing valve (20) which is connected to the control (19) and is opened and closed depending on the water level observed by the sensors (17, 18).

7. An apparatus according to claim 1, characterized in that in the cold-water reservoir (2), at the lowest point thereof, a float (21) is disposed which is connected to a control (19), wherein the control (19) is also connected to the through-flow heating element (7), wherein the float (21) is adapted to provide a signal to the control (19) when the water level in the cold-water reservoir (2) drops below a particular minimum level, wherein the control (19) is adapted to switch off the through-flow heating element (7) upon the reception of said signal.

8. An apparatus according to claim 1, characterized in that the hot-water reservoir (3) comprises a third sensor (22) for the minimum water level, a fourth sensor (23) for the maximum water level and a fifth sensor (24) whereby a water level is detected above which water level the tapping of warm water is permitted, wherein a temperature sensor (25) is also provided in the hot-water reservoir, said temperature sensor (25) being located below the level at which the fifth sensor (24) is provided, wherein the sensors (22, 23, 24, 25) are all connected to a control (26) which switches the heat-maintaining element (4) on and off depending on the temperature signal provided by the temperature sensor (25), said control (26) switching on the through-flow heating element (7) when the water level in the hot-water reservoir (7) is below the level of the fourth sensor (23) and turning on or off a signal light when the water level is respectively above or below the level, or vice versa, of the fifth sensor (24).

9. An apparatus according to claim 8, characterized in that the control (26) is adapted to switch the heat-maintaining element (4) on and off so that the water in the hot-water reservoir (3) has a temperature of between about 90° C. and about 97° C.

10. An apparatus according to claim 1, characterized by a second cold-water reservoir comprising a second discharge conduit accommodating a second through-flow heating element, wherein the second discharge conduit opens above a coffee filter holder, said coffee filter holder comprising an extract discharge opening into a coffee pot, wherein a control of the apparatus is designed so that in each case only one through-flow heating element is switched on, wherein the second through-flow heating element, intended for forming hot water for coffee, is given priority over the through-flow heating element (7) intended for filling the hot-water reservoir (3), to enable connection to a single-phase electricity connection.

11. An apparatus for heating water intended for the preparation for hot beverages, comprising a cold-water reservoir for storing unheated water and a hot-water reservoir for storing heated water, wherein a heat maintaining element is accommodated in the hot-water reservoir, wherein the hot-water reservoir comprises a draw off tap, and wherein a conduit is connected to the cold-water reservoir which conduit opens into the hot-water reservoir, wherein the hot-water reservoir comprises a draw off tap, and wherein a conduit is connected to the cold-water reservoir which conduit opens into the hot-water reservoir, wherein a through-flow heating element is accommodated in said conduit, the hot-water reservoir comprising a minimum water level sensor, a maximum water level sensor and a water level sensor for detecting when a water level is reached permitting the tapping of warm water via said tap is permitted, a temperature sensor located below the water level sensor, wherein the sensors are all connected to a control which switches the heat maintaining element on and off depending on the temperature signal provided by the temperature sensor, said control switching on the through flow heating element when the water level in the hot-water reservoir is below the level of the maximum water level sensor and turning on or off a signal light when the water level is respectively above or below the level, or vise versa, of the water level sensor.

* * * * *